United States Patent
Nakamura et al.

(10) Patent No.: US 11,119,338 B2
(45) Date of Patent: Sep. 14, 2021

(54) SOFT CONTACT LENS AND METHOD FOR SUPPRESSING ATTACHMENT OF SOFT CONTACT LENS ONTO CORNEA

(71) Applicants: Seed Co., Ltd., Tokyo (JP); Toray Industries, Inc., Tokyo (JP)

(72) Inventors: Akira Nakamura, Tokyo (JP); Tsutomu Fukushima, Tokyo (JP); Rumiko Kitagawa, Otsu (JP); Masataka Nakamura, Otsu (JP)

(73) Assignees: SEED CO., LTD., Tokyo (JP); TORAY INDUSTRIES, INC., Tokyo (JP)

( * ) Notice: Subject to any disclaimer, the term of this patent is extended or adjusted under 35 U.S.C. 154(b) by 225 days.

(21) Appl. No.: 16/089,771

(22) PCT Filed: Apr. 3, 2017

(86) PCT No.: PCT/JP2017/013913
§ 371 (c)(1),
(2) Date: Sep. 28, 2018

(87) PCT Pub. No.: WO2017/175705
PCT Pub. Date: Oct. 12, 2017

(65) Prior Publication Data
US 2020/0310161 A1     Oct. 1, 2020

(30) Foreign Application Priority Data

Apr. 4, 2016    (JP) .............................. JP2016-075439

(51) Int. Cl.
*G02C 7/04*     (2006.01)
*C08F 290/06*   (2006.01)

(52) U.S. Cl.
CPC .......... *G02C 7/049* (2013.01); *C08F 290/068* (2013.01); *G02C 7/047* (2013.01)

(58) Field of Classification Search
CPC .......................... G02C 7/049; C08F 290/068
(Continued)

(56) References Cited

U.S. PATENT DOCUMENTS

| 4,193,672 A * | 3/1980 | Trombley ............... | G02C 7/04 351/159.1 |
| 4,952,045 A * | 8/1990 | Stoyan ................... | G02C 7/047 351/159.1 |

(Continued)

FOREIGN PATENT DOCUMENTS

| JP | 0743698 A  | 2/1995 |
| JP | 07043698 U | 9/1995 |

(Continued)

OTHER PUBLICATIONS

Extended European Seach Report for European Application No. 17779083.9, dated Oct. 11, 2019, 9 pages.

(Continued)

*Primary Examiner* — Zachary W Wilkes
(74) *Attorney, Agent, or Firm* — RatnerPrestia

(57) ABSTRACT

A soft contact lens has low water content or no water content. The soft contact lens includes: a circular central part positioned at a center of the soft contact lens; an intermediate part positioned at an outer peripheral side of the central part and forming an annular shape having a center coaxial with the central part; and an outer edge part positioned at an outer peripheral side of the intermediate part and forming an annular shape having a center coaxial with the central part. Respective radii of curvature of the central part, the intermediate part, and the outer edge part are different from each other, and a sagittal depth of the soft contact lens is within a range of a sagittal depth in a case where the entire soft contact lens is formed in a range of a radius of curvature ±0.2 mm of the outer edge part.

15 Claims, 3 Drawing Sheets

(58) Field of Classification Search
USPC .................................................. 359/159.36
See application file for complete search history.

(56) References Cited

U.S. PATENT DOCUMENTS

| | | | | |
|---|---|---|---|---|
| 4,954,586 A * | 9/1990 | Toyoshima | ............ | C08F 220/22 |
| | | | | 523/107 |
| 5,214,453 A * | 5/1993 | Giovanzana | ........... | G02C 7/042 |
| | | | | 351/159.42 |
| 6,010,219 A * | 1/2000 | Stoyan | ................... | G02C 7/047 |
| | | | | 351/159.23 |
| 6,602,930 B2 * | 8/2003 | Imafuku | ................ | G02B 1/043 |
| | | | | 523/107 |
| 6,727,336 B1 * | 4/2004 | Ito | ............................ | A61L 27/18 |
| | | | | 526/279 |
| 6,733,124 B2 * | 5/2004 | Miyamura | ............. | G02C 7/041 |
| | | | | 351/159.05 |
| 7,071,274 B2 * | 7/2006 | Fujisawa | ................. | C08F 30/08 |
| | | | | 526/320 |
| 8,678,584 B2 * | 3/2014 | de Juan, Jr. | ............ | G02C 7/049 |
| | | | | 351/159.18 |
| 8,827,447 B2 * | 9/2014 | Awasthi | ................. | G02B 1/043 |
| | | | | 351/159.24 |
| 8,911,083 B2 | 12/2014 | Brent | | |
| 9,046,644 B2 | 6/2015 | Nakamura et al. | | |
| 9,086,580 B2 * | 7/2015 | Grant | ..................... | A61K 38/47 |
| 9,297,930 B2 | 3/2016 | Nakamura et al. | | |
| 9,395,558 B2 | 7/2016 | de Juan et al. | | |
| 10,254,564 B2 * | 4/2019 | Grant | ................... | A61K 9/0051 |
| 10,598,955 B2 * | 3/2020 | Creighton | .............. | G02C 7/024 |
| 2004/0054106 A1 * | 3/2004 | Ito | ......................... | C08F 290/06 |
| | | | | 526/279 |
| 2004/0192872 A1 * | 9/2004 | Iwata | ................... | C08F 290/065 |
| | | | | 528/25 |
| 2012/0314183 A1 * | 12/2012 | Nakamura | ............... | G02B 1/10 |
| | | | | 351/159.02 |
| 2014/0043588 A1 | 2/2014 | Grant et al. | | |
| 2016/0109725 A1 | 4/2016 | Grant et al. | | |
| 2019/0369415 A1 | 12/2019 | Grant et al. | | |

FOREIGN PATENT DOCUMENTS

| | | |
|---|---|---|
| JP | 2001516462 A | 9/2001 |
| JP | 2006525530 A | 11/2006 |
| JP | 2007195818 A | 8/2007 |
| JP | 2013544132 A | 12/2013 |
| JP | 2015524580 A | 8/2015 |
| WO | 9724639 A1 | 7/1997 |
| WO | 2005006060 A1 | 1/2005 |
| WO | 2009149116 A2 | 12/2009 |
| WO | 2011102356 A1 | 8/2011 |
| WO | 2012061160 A1 | 5/2012 |

OTHER PUBLICATIONS

International Search Report and Written Opinion for International Application No. PCT/JP2017/013913, dated Jun. 27, 2017—7 pages.
Notice of Reasons far Refusal far Japanese Application No. 2017-518378, dated Jan. 26, 2021, with translation, 12 pages.

* cited by examiner

SOFT CONTACT LENS AND METHOD FOR SUPPRESSING ATTACHMENT OF SOFT CONTACT LENS ONTO CORNEA

CROSS REFERENCE TO RELATED APPLICATIONS

This is the U.S. National Phase application of PCT/JP2017/013913, filed Apr. 3, 2017, which claims priority to Japanese Patent Application No. 2016-075439, filed Apr. 4, 2016, the disclosures of each of these applications being incorporated herein by reference in their entireties for all purposes.

FIELD OF THE INVENTION

The present invention relates to a soft contact lens that can suppress attachment onto a cornea during wearing and has excellent wearing feeling, and a method for suppressing attachment of the soft contact lens onto a cornea.

BACKGROUND OF THE INVENTION

Contact lenses are roughly classified into soft contact lenses (SCL) and hard contact lenses (HCL). From the viewpoint of wearing feeling, the soft contact lenses are frequently selected.

The term "wearing feeling" means low foreign body sensation when contact lenses are worn, that is, comfort. The wearing feeling varies depending on the behavior on a cornea and design. In the case of wearing the contact lenses, tear fluid exists between the base curve surface of the contact lens and a cornea. In particular, when the soft contact lenses are worn, the tear fluid plays an important role in reducing contamination of the soft contact lens itself and assisting oxygen supply to the cornea. Prevention of tear fluid replacement (flow) may cause medical problems such as corneal damage due to contamination of the soft contact lens and oxygen deficiency.

The replacement of the tear fluid between the base curve surface of the contact lens and the cornea is carried out by moving the contact lens on the cornea by blinking. The movement of the contact lens on the cornea, however, affects the wearing feeling and when the movement is excessively large, the wearing feeling deteriorates due to a foreign body sensation. Therefore, contact lenses capable of suitably carrying out replacement of the tear fluid have been desired although the contact lenses have stability of not feeling unpleasantness during wearing.

In order to increase the amount of the tear liquid stored between the contact lens and an eyeball to sufficiently moisturize the surface of the eyeball and to wear the contact lens stably, a contact lens having an annular gap for storing the tear fluid between the contact lens and the eyeball along the outer peripheral edge of the inner surface has been disclosed (refer to, for example, Patent Literature 1).

In order to sufficiently flow tear to replace the tear by the flow and to reduce interference with normal eye metabolism, a contact lens having an optical zone providing a monofocal optical property located in the center and a peripheral zone surrounding the optical zone and providing a three-dimensional pattern on the back side (the side in contact with the cornea) of the peripheral zone has been disclosed (refer to, for example, Patent Literature 2).

On the other hand, soft contact lenses have a problem of low oxygen permeability despite the excellent wearing feeling. In recent years, therefore, a low water content or no water content soft contact lens containing a silicone compound as a constituent component and having excellent oxygen permeability to a cornea and wearing feeling has been developed (see, for example, Patent Literature 3).

PATENT LITERATURE

Patent Literature 1: Japanese Utility Model Application Laid-open No. H7-043698
Patent Literature 2: Published Japanese Translation of PCT International Publication for Patent Application No. 2001-516462
Patent Literature 3: WO 2011/102356 Pamphlet

SUMMARY OF THE INVENTION

Although the soft contact lens according to Patent Literature 3 has excellent oxygen permeability, the soft contact lens tends to be attached onto a cornea as compared with a water-containing soft contact lens and thus a countermeasure against this attachment is required.

As a means for reducing attachment of a soft contact lens onto a cornea, a method of designing a large base curve has been used. However, the design range of the diameter of the soft contact lens is restricted in view of the structure of eyes. When a soft contact lens having a large base curve is designed with a single radius of curvature, the value of the sagittal depth (the depth of the lens) of the soft contact lens having an almost same diameter as a commonly used soft contact lens becomes small. When the sagittal depth is small, the stability of the position of the soft contact lens on a cornea during wearing deteriorates, which is what is called loose fitting. This causes deterioration in the wearing feeling and reduction in the effect of correcting visual acuity, which is not preferable.

The present invention has been made in view of the above problems and an object of the present invention is to provide a soft contact lens containing a silicone compound as a constituent component that is capable of suppressing attachment onto a cornea during wearing and having an excellent fitting property and a method for suppressing attachment of the soft lens onto the cornea.

When a low water content or no water content soft contact lens having a large radius of curvature at the central part of the lens is designed, attachment onto the cornea is suppressed. However, this design causes decrease in the sagittal depth. Therefore, the stability on the cornea is poor and the wearing feeling and the fitting property deteriorate.

The inventors of the present invention have intensively studied the design combining both of the radius of curvature that can suppress attachment onto the cornea and the sagittal depth that provides the high wearing feeling and the high fitting property for a low water content or no water content soft contact lens. In the course of this study, the inventors of the present invention have completed the present invention.

To solve the problem described above and to achieve the object, a soft contact lens according to the present invention is a soft contact lens that has low water content or no water content. The soft contact lens includes: a circular central part positioned at a center of the soft contact lens; an intermediate part positioned at an outer peripheral side of the central part and forming an annular shape having a center coaxial with the central part; and an outer edge part positioned at an outer peripheral side of the intermediate part and forming an annular shape having a center coaxial with the central part. Respective radii of curvature of the central part, the intermediate part, and the outer edge part are different from each other, and a sagittal depth of the soft contact lens is within a range of a sagittal depth in a case where the entire soft contact lens is formed in a range of a radius of curvature ±0.2 mm of the outer edge part.

In the soft contact lens according to the present invention, the radius of curvature of the intermediate part is smaller than the radii of curvature of the central part and is smaller than the radii of curvature of the outer edge part.

In the soft contact lens according to the present invention, the radii of curvature of the central part, the intermediate part, and the outer edge part satisfy the following formula Radius curvature of central part>Radius of curvature of outer edge part>Radius of curvature of intermediate part.

In the soft contact lens according to the present invention, the radius of curvature of the outer edge part is 60% to 97% relative to the radius of curvature of the central part and the radius of curvature of the intermediate part is 60% to 98% relative to the radius of curvature of the outer edge part.

In the soft contact lens according to the present invention, at least one through hole penetrating from a front surface to a back surface of the soft contact lens is provided in the soft contact lens.

In the soft contact lens according to the present invention, the through hole is provided in the intermediate part.

A method for suppressing attachment of a soft contact lens onto a cornea, according to the present invention, includes using any one of the above-mentioned soft contact lenses.

According to the soft contact lens and the method for suppressing attachment of the soft contact lens onto a cornea of the present invention, the attachment of the soft contact lens onto the cornea is suppressed and thus damage to corneal cells can be reduced. The soft contact lens of the present invention also has excellent oxygen permeability and the excellent fitting property and thus exerts an excellent vision correction effect.

DETAILED DESCRIPTION OF EMBODIMENTS OF THE INVENTION

Hereinafter, details of the soft contact lens of the present invention will be described with reference to the embodiment. The embodiment, however, does not limit the present invention.

Figure 1:
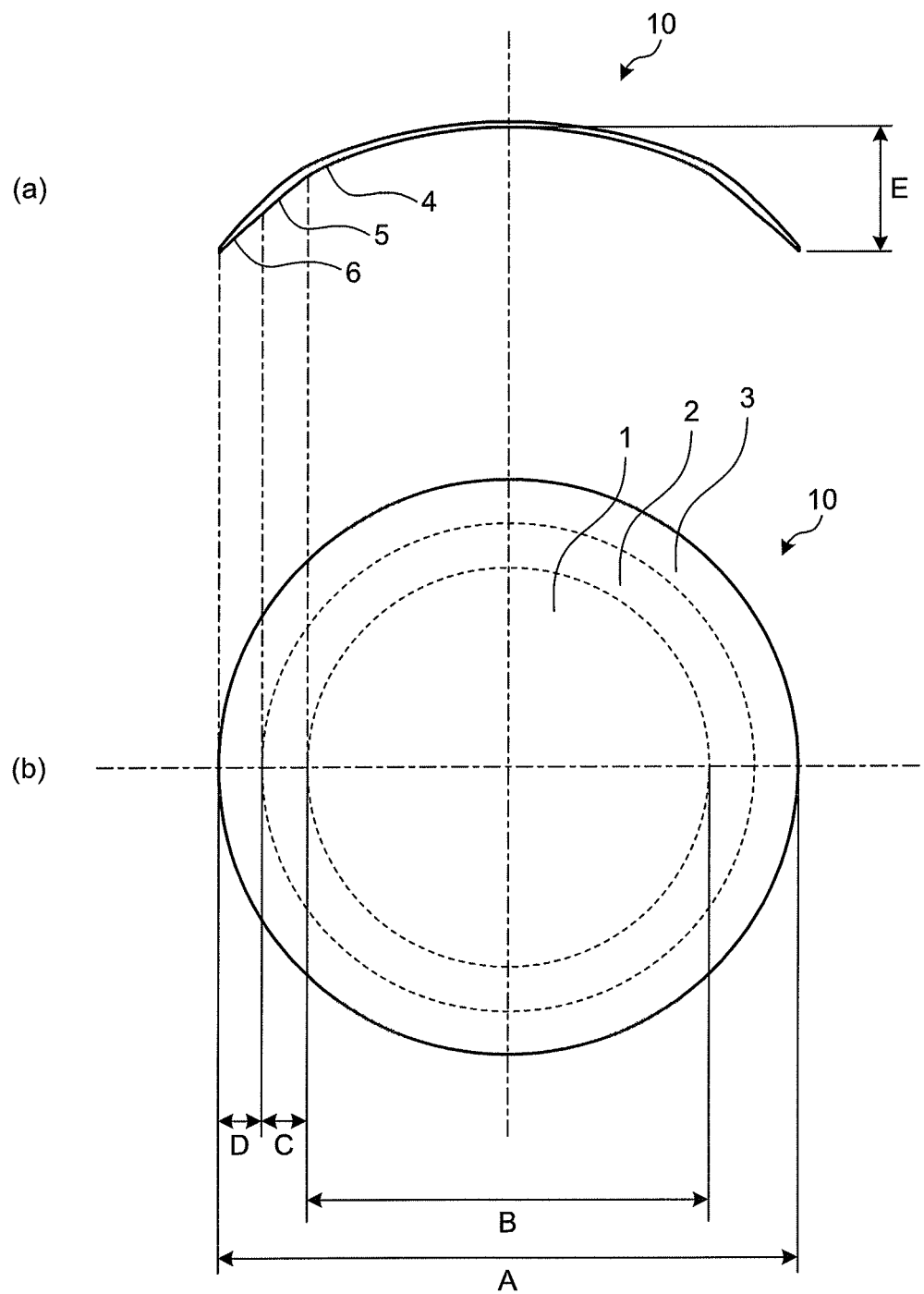
FIG. 1 includes (a) a cross-sectional view and (b) a plan view illustrating a soft contact lens according to the embodiment of the present invention.

As illustrated in FIG. 1, a contact lens 10 of the present invention is a soft contact lens having no water content or low water content. The contact lens 10 includes a circular central part 1 positioned at the center of the contact lens 10, an intermediate part 2 positioned at the outer peripheral side of the central part 1 and forming an annular shape having a center coaxial with the central part 1, and an outer edge part 3 positioned at the outer peripheral side of the intermediate part 2 and forming an annular shape having a center coaxial with the central part 1. The contact lens 10 is characterized in that respective radii of curvature of the central part 1, the intermediate part 2, and the outer edge part 3 of the contact lens 10 are different from each other and the sagittal depth E of the contact lens 10 is within a range of a value (F1 to F2) that sagittal depth F can take, the sagittal depth F being obtained in the case where the entire contact lens 10' (10'-1 or 10'-2) (refer to FIG. 2 and FIG. 3) having a uniform radius of curvature is formed in a range of the radius of curvature ±0.2 mm of the outer edge part 3.

More specifically, the inventors of the present invention have found that the contact lens 10 having excellent attachment suppression property and fitting property can be obtained by joining the central part 1, the intermediate part 2, and the outer edge part 3 having different radii of curvature each other, tentatively designing a contact lens 10' (10'-1 or 10'-2) that is formed in a uniform radius of curvature in a range of the radius of curvature ±0.2 mm of the outer edge part 3 of the contact lens 10 in the design of the sagittal depth of the contact lens 10, and setting the range (F1 to F2) of the value that the sagittal depth F can take to the range of the value that the sagittal depth E of the contact lens 10 can take.

The sagittal depth F in the case where the radius of curvature of the outer edge part 3 is G will be described. A spherical surface (spherical shell) having radius G is drawn. The spherical surface is cut off with a plane surface to obtain a spherical crown (contact lens 10'). At this time, the diameter of the circle on the cut face of the spherical crown (the diameter of the contact lens 10') is set to the same value as the diameter of the contact lens 10. The sagittal depth of the obtained spherical crown (contact lens 10') is the sagittal depth F.

As a lens for cornea correction (orthokeratology), a lens having different radii of curvature of the central part and the outer peripheral part have been developed (for example, refer to Japanese Patent Laid-Open No. 2007-195818). The lens for orthokeratology is a contact lens used for orthokeratology, in which the shape of the central part, that is, the shape of the central part on the side where of the lens is in contact with the cornea is flattened to reduce or eliminate refraction abnormality. By wearing the lens for orthokeratology during sleeping, the shape of the cornea can be corrected. After the lens is removed, the naked eye sight can be maintained for a certain period of time.

The lens for orthokeratology described in Japanese Patent Application Laid-Open No. 2007-195818 has a structure in which the central part having a flat radius of curvature and the outer peripheral part connected to the central part and having a sharper radius of curvature than the curved surface of the cornea are integrally combined. The orthokeratology lens has the flattened shape of the central part and corrects the shape of the cornea by wearing the lens. The lens for orthokeratology does not suppress the attachment between the lens and the cornea due to the lens shape. Therefore, the detailed design of the sagittal depth is not described and the attachment of the lens onto the cornea is suppressed by providing introduction holes penetrating from the front surface to the back surface in the outer peripheral part. In the case of hard contact lenses, however, deformation of the contact lens due to eyelid pressure hardly occurs and thus pumping of tear fluid by eyelid pressure can hardly be expected. On the other hand, the contact lens according to the present invention is a soft contact lens and thus pumping of tear fluid due to deformation of the contact lens by eyelid pressure can be expected.

The contact lens 10 according to the present invention is a no water content or low water content soft contact lens in which the substrate is formed of a polymeric material including a component (A) that is a polysiloxane compound having a plurality of polymerizable functional groups per molecule and a number average molecular weight of 6,000 or more. The contact lens 10 is a contact lens improving both suppression property of attachment onto a cornea and fitting property while exhibiting a vision correction effect by setting respecting radii of curvature of the central part 1, the intermediate part 2, and the outer edge part 3 of the contact lens 10 different from each other and setting the value of the sagittal depth E of the contact lens 10 within the range of the sagittal depth F (F1 to F2) obtained in the case where the entire contact lens 10' (10'-1 or 10'-2) having a uniform radius of curvature ±0.2 mm is formed within a range of the radius of curvature of the outer edge part 3. Therefore, the soft contact lens of the present invention is the invention having different thought from the above contact lens for orthokeratology.

The soft contact lens of the present invention is preferably a contact lens for visual acuity correction that is not aimed at cornea correction. The soft contact lens of the present invention is remarkably suitable as the contact lens for vision correction because attachment onto the cornea during wearing is suppressed. The effect of suppressing attachment onto the cornea is achieved in part by the pumping effect of tear fluid with deformation and recovery of the lens.

The soft contact lens of the present invention is preferably not aimed at cornea correction. The soft contact lens of the present invention is a soft contact lens having no water content or low water content and thus a significant effect cannot be expected for cornea correction for which a hard contact lens is usually used. The soft contact lens of the present invention suppresses attachment onto the cornea due to the pumping effect of tear fluid with deformation and recovery of the lens. Therefore, the soft contact lens of the present invention is the invention having different thought from the contact lens for orthokeratology that is worn during sleeping when the deformation and recovery of the lens hardly occurs.

The outer diameter A of the contact lens 10 of the present invention is not particularly limited as long as the contact lens 10 does not cause a problem of wearing. In consideration of the insertability onto an eyeball, a wearing property, and a covering property of a sclera surface, the outer diameter A is preferably 13 mm to 15 mm and more preferably 13.5 mm to 14.5 mm.

In consideration of the visibility correction capability and the attachment suppression property onto the cornea during wearing the contact lens 10, the inner diameter B of the central part 1 is preferably 5 mm to 14 mm and more preferably 6 mm to 11 mm. From the viewpoint of the attachment suppression property onto the cornea, the base curve 4 of the central part 1 is preferably designed to have a radius of curvature X of 8.5 mm to 15 mm and more preferably 8.5 mm to 13 mm. The preferable range of the radius of curvature X is preferably 8.7 mm to 12.8 mm, more preferably 9.0 mm to 12.5 mm, and most preferably 9.0 mm to 12.0 mm. These upper limit values and lower limit values can be arbitrarily combined.

The width D of the outer edge part 3 is preferably 0.1 mm to 5 mm and more preferably 0.1 mm to 2 mm with reference to the outer edge of the contact lens 10. Designing the outer edge part 3 within this range allows an effect of improving the fitting property to be obtained without impairing the corneal attachment suppressing effect. From the viewpoint of stability on a sclera, the base curve 6 of the outer edge part 3 is preferably designed to have a radius of curvature Z of 8.0 mm to 9.5 mm and more preferably 8.3 mm to 9.3 mm. The radius of curvature Z of the outer edge part 3 is designed so that the radius of curvature Z is set to 60% to 97% relative to the value of the radius of curvature X of the base curve 4 of the central part 1. This design allows tear fluid to be easily taken in between the contact lens 10 and the cornea and suitably acts on attachment suppression onto the cornea. The radius of curvature Z is more preferably 65% to 95%, further preferably 67% to 92%, and most preferably 70% to 90% of the radius of curvature X. These upper limit values and lower limit values can be arbitrarily combined.

The width C of the intermediate part 2 is preferably 0.5 mm to 3.0 mm and more preferably 0.5 mm to 2.0 mm with reference to the inner edge of the outer edge part 3. The base curve 5 of the intermediate part 2 is preferably formed so that the radius of curvature Y is smaller than the radius of curvature X of the central part 1 and the radius of curvature Z of the outer edge part 3. The design in this range suitably acts on the attachment suppression onto the cornea. The value of the radius of curvature Y of the intermediate part 2 is designed so that the value of the radius of curvature Y is set to 60% to 98% relative to the value of the radius of curvature Z of the outer edge part 3. This design suitably acts on the attachment suppression onto the cornea. The radius of curvature Y is more preferably 65% to 95%, further preferably 67% to 92%, and most preferably 70% to 90% of the radius of curvature Z. These upper limit values and lower limit values can be arbitrarily combined.

The sagittal depth E of the contact lens 10 is formed to be 2.13 mm to 6.09 mm by forming the radius of curvature Y of the intermediate part 2 and the radius of curvature Z of the outer edge part 3 within the above ranges. This results in improved stability of the contact lens 10 on the cornea during wearing and allows the excellent fitting property to be obtained.

Figure 2:
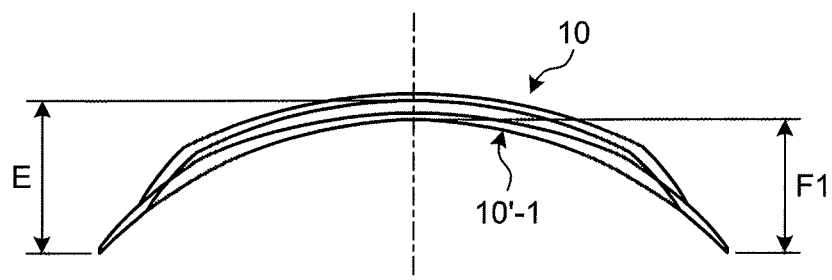
FIG. 2 is a cross-sectional view in which the soft contact lens illustrated in FIG. 1 and a soft contact lens having a uniform radius of curvature according to a conventional art are overlapped.
Figure 3:
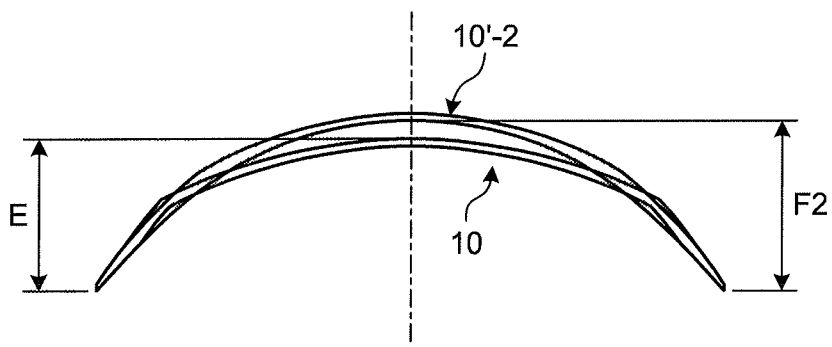
FIG. 3 is a cross-sectional view in which the soft contact lens illustrated in FIG. 1 and a soft contact lens having a uniform radius of curvature according to a conventional art are overlapped.

The value of the sagittal depth E of the contact lens 10 is designed so that the value of the sagittal depth E is within the range of a value (F1 to F2) that the sagittal depth F of the entire contact lens 10' (10'-1 or 10'-2) can take, the contact lens 10' having a uniform radius of curvature, that is, the contact lens 10' (10'-1 or 10'-2) designed with a uniformly constant curvature radius in a range of a radius of curvature Z±0.2 mm of the base curve 6 of the outer edge part 3. This suitably acts on the attachment suppression onto the cornea. FIG. 2 and FIG. 3 are cross-sectional views in which the contact lens 10 of the present invention illustrated in FIG. 1 and contact lenses 10' (10'-1 or 10'-2) having a uniform radius of curvature according to a conventional art are overlapped. The contact lens 10 is illustrated in an overlapped manner with a contact lens 10'-1 having the radius of curvature of the entire parts being a radius of curvature Z+0.2 mm of the base curve 6 of the outer edge part 3 in FIG. 2 and a contact lens 10'-2 having the radius of curvature of the entire parts being a radius of curvature Z−0.2 mm of the base curve 6 of the outer edge part 3 in FIG. 3. The value of the sagittal depth E of the contact lens 10 is designed so that the value of the sagittal depth E is set within the range of the sagittal depth F1 of the contact lens 10'-1 having the radius of curvature Z+0.2 mm to the sagittal depth F2 of the contact lens 10'-2 having the radius of curvature Z−0.2 mm. This suitably acts on the attachment suppression onto the cornea.

Figure 4:
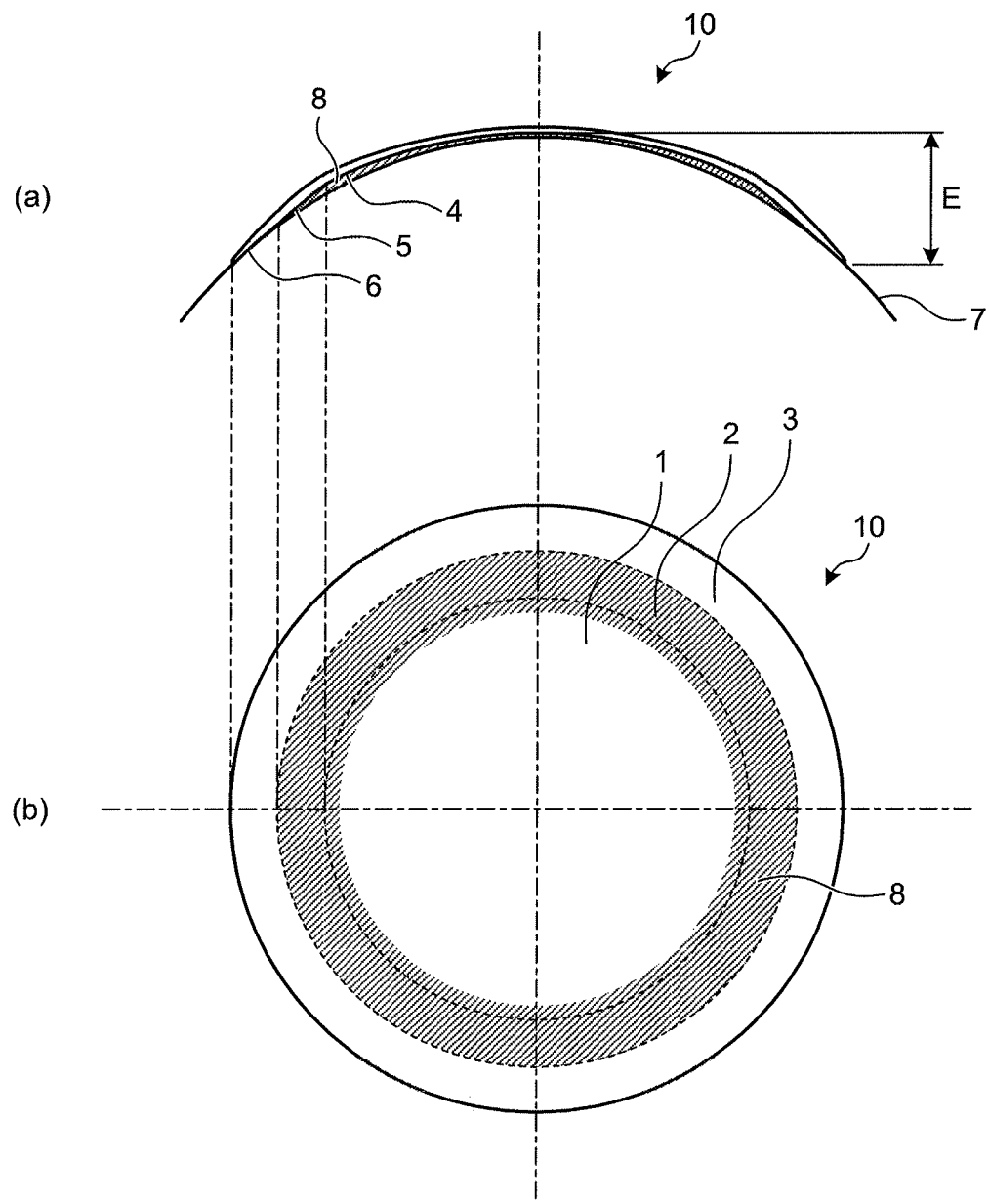
FIG. 4 includes (a) a cross-sectional view and (b) a plan view in the case where the soft contact lens according to the embodiment of the present invention is worn.

FIG. 4 includes (a) a cross-sectional view and (b) a plan view in the case where the contact lens 10 according to the embodiment of the present invention is worn. When the contact lens 10 is worn on an eyeball 7, a tear reservoir 8 is formed at the outer edge of the intermediate part 2 and the central part 1 with a small radius of curvature. The attachment of the contact lens 10 onto the eyeball 7 is suppressed by holding a larger amount of tear fluid in this tear reservoir 8 than the amount of tear fluid held by a conventional art contact lens. As described in detail below, the contact lens 10 is a low water content or no water content soft contact lens containing a silicone compound as a constituent component. Therefore, it is presumed that the contact lens 10 is deformed so as to conform to the shape of the eyeball 7 by blinking and tear fluid replacement occurs when the contact lens 10 is restored to the original shape and thus contamination and attachment of the contact lens 10 can be suppressed.

The radii of curvature X, Y, Z of the central part 1, the intermediate part 2, and the outer edge part 3 of the contact lens 10 respectively preferably satisfy the radius of curvature X of the central part 1>the radius of curvature Z of the outer edge part 3>the radius of curvature Y of the intermediate part 2. The requirement, however, is satisfied when the radius of curvature Y of the intermediate part 2 is the smallest and the radius of curvature Z of the outer edge part 3 may be larger than the radius of curvature X of the central part 1.

The contact lens 10 of the present invention may have a bevel at the outer periphery side of the outer edge part 3 as long-as the respective radii of curvature of the central part 1, the intermediate part 2, and the outer edge part 3 are different from each other and the sagittal depth of the contact lens 10 is within the range of the sagittal depth F (F1 to F2) in the case where the entire contact lens 10' (10'-1 or 10'-2) having a uniform radius of curvature in the range of the radius of curvature ±0.2 mm of the outer edge part 3 is formed. In this case, the width of the bevel is not particularly limited as long as the width of the bevel is within a range normally used for forming a contact lens.

In the soft contact lens of the present invention, a hole (through hole) penetrating from the front surface to the back surface of the contact lens 10 is preferably provided. Tear fluid can move in the thickness direction of the lens and tear fluid replacement is facilitated by providing the through hole, so that the attachment of the contact lens 10 onto the cornea is less likely to occur.

The through hole is preferably provided in the intermediate part 2 from the viewpoint of tear fluid replacement and tear fluid retention. When the soft contact lens of the present invention is worn, the particularly large amount of the tear fluid exists between the intermediate part and the cornea. At the time of closing an eyelid, the eyelid pressure deforms the soft contact lens and the tear fluid is pushed out and at the time of opening the eyelid, the eyelid pressure is released and the soft contact lens returns to its original shape. This causes inflow of the tear fluid again between the contact lens and the cornea (pumping of tear fluid). When the through hole exists in the intermediate part where the particularly large amount of tear fluid exists, the tear fluid can easily come in and go out through the through hole and thus the pumping can be carried out extremely smoothly, which is preferable.

The number of the through holes is preferably 1 or more, more preferably 2 or more, and most preferably 3 or more. The number of the through holes is preferably 120 or less, more preferably 60 or less, further preferably 24 or less, and most preferably 12 or less. When the number of the through holes is excessively small, the effect of the through holes may not be sufficiently developed, which is not preferable. When the number of the through holes is excessively large, the strength of the contact lens and the wearing feeling may be adversely affected, which is not preferable.

When a plurality of through holes are provided, the through holes are preferably provided at regular intervals. Each of the through holes is more preferably provided at regular intervals on the circumference of (hypothetical) circle of which the center is determined to be the center of the contact lens 10. The circumference of the hypothetical circle provided with the through hole is preferably positioned at the intermediate part 2. The through holes are not limited to being arranged on one circumference of a hypothetical circle but may be arranged on two or more circumferences of hypothetical circles having different radii. The number of the hypothetical circles is preferably 10 or less, more preferably 5 or less, further preferably 3 or less, and most preferably 2 or less. When the number of the hypothetical circles is excessively large, the strength of the contact lens 10 and the wearing feeling may be adversely affected, which is not preferable. The shape of the through hole (a cross section orthogonal to the hole axis of the through hole) can be arbitrarily determined. From the viewpoint of forming cost and efficiency of tear fluid replacement, a circular shape or a substantially circular shape is preferable.

The largest value among the distances between arbitrary two points on the circumference of the cross section of the through hole is determined to be the diameter of the through hole. The diameter of the through hole is preferably 300 μm or less, more preferably 200 μm or less, more preferably 100 μm or less, more preferably 50 μm or less, more preferably 30 μm or less, more preferably 20 μm or less, or further preferably 10 μm or less. The diameter of the through hole is preferably 0.1 μm or more, more preferably 1 μm or more, more preferably 3 μm or more, or further preferably 5 μm or more. When the diameter of the through hole is excessively small, the effect of the through hole may not be sufficiently developed, which is not preferable. When the diameter of the through hole is excessively large, the strength and wearing feeling of the contact lens 10 may be adversely affected, which is not preferable.

As a method for forming the through hole, a water jet method, a drill method, a punching method, a laser method, an electron beam irradiation method, a neutron irradiation method, or the like can be applied. From the viewpoints of processing accuracy and processing cost, the punching method and the laser method are preferable.

The substrate of the contact lens 10 of the present invention is a soft substrate having no water content or low water content. The term "low water content" means that the water content is 30% by mass or less. The term "no water content" means that the water content is 0% by mass. The term "soft" means that the tensile elastic modulus is 10 MPa or less.

In this specification, the water content is determined, for example, by the following formula from the mass of the test piece in the form of a contact lens in the dry state and the mass (mass in a wet state) when the surface water of the test piece in a wet state with the phosphate buffer solution was wiped off.

$$\text{Water content}(\%) = \{[(\text{Mass in wet state}) - (\text{Mass in dry state})]/(\text{Mass in wet state})\} \times 100$$

In this specification, the term "wet state" means a state in which the test piece is immersed in pure water or the phosphate buffer solution at room temperature (25° C.) for 24 hours or more. Measurement of physical property values in the wet state is carried out as soon as possible after the test piece is taken out from the pure water or the phosphate buffer solution.

In this specification, the term "dry state" means a state in which the test piece in a wet state is vacuum-dried at 40° C. for 2 hours. The degree of vacuum in the vacuum drying is set to 2 hPa or less. Measurement of the physical property value in the dry state is carried out as soon as possible after the vacuum drying as described above.

When the contact lens 10 has low water content or no water content, the contact lens 10 has a feature that a wearer feels less dryness of his or her eyes and the wearer has excellent wearing feeling. The contact lens 10 also has the advantage that the risk of bacterial reproduction is low. From such a viewpoint, the water content of the contact lens 10 is preferably low. In the case of low water content, respective 25% by mass or less, 20% by mass or less, 15% by mass or less, 10% by mass or less, 5% by mass or less, 2% by mass or less, and 1% by mass or less are preferable and less than 1% by mass is most preferable. The contact lens 10 has no water content when the water content is 0% by mass. When the water content is excessively high, for example, the feeling of dryness of the eyes of the wearer of the contact lens 10 increases or the risk of reproduction of bacteria increases, which is not preferable.

The tensile elastic modulus of the contact lens 10 is preferably 0.01 MPa to 5 MPa, more preferably 0.1 MPa to 3 MPa, further preferably 0.1 MPa to 2 MPa, further more preferably 0.1 MPa to 1 MPa, and most preferably 0.1 MPa to 0.6 MPa. When the tensile elastic modulus is excessively small, handling tends to be difficult because of excessive softness of the soft contact lens. When the tensile elastic modulus is excessively. large, the soft contact lens tends to be excessively hard and wearing feeling tends to worse. In addition, the pumping effect of the tear fluid associated with deformation and recovery of the lens is small and thus the suppression property of attachment is reduced. When the tensile elastic modulus is 2 MPa or less, an excellent wearing feeling is obtained and when the tensile elastic modulus is 1 MPa or less, more excellent wearing feeling can be obtained, which is preferable. The tensile elastic modulus is measured using a test piece in the wet state with the phosphate buffer solution.

The tensile elongation (elongation at break) of the contact lens 10 is preferably 100% to 1,500% and more preferably 200% to 1,000%. When the tensile elongation is small, the contact lens 10 tends to break easily, which is not preferable. When the tensile elongation is excessively large, the contact lens 10 tends to be easily deformed, which is not preferable. Tensile elongation is measured using a test piece in the wet state with the phosphate buffer solution.

In the contact lens 10 of the present invention, the surface of the substrate is preferably modified. The modification method is not particularly limited and any known suitable materials or any suitable materials to be developed in the future can be used. Specific examples of the method include an LbL method (Layer by Layer method) in which two polymer materials having opposite charges are alternately coated layer by layer, a plasma processing method, and a γ-ray irradiation method.

The static contact angle of the contact lens 10 of the present invention is preferably 100° or less, more preferably 90° or less, and further preferably 80° or less. From the viewpoint of preventing sticking to the cornea of a wearer, the static contact angle is preferably lower. The static contact angle is preferably 70° or less, more preferably 65° or less, further preferably 60° or less, further more preferably 55° or less, and most preferably 50° or less. The static contact angle is measured at a site where the contact lens 10 is taken out from the phosphate buffer solution and nitrogen is blown for 5 seconds.

From the viewpoint of preventing sticking to the cornea of the wearer, a liquid film holding time on the surface of the contact lens 10 is preferably long. In this specification, the term "liquid film holding time" means a period of time during which the liquid film on the surface of the contact lens 10 is held without being broken when the contact lens 10 immersed in the phosphate buffer solution is pulled out from the solution and thereafter is held in air so that the diameter direction is vertical. The liquid film holding time is preferably 5 seconds or more, more preferably 10 seconds or more, and most preferably 20 seconds or more. In this specification, the term "diameter" means a diameter of a circle formed by the edge part of the contact lens 10.

From the viewpoint of supplying oxygen from the atmosphere to the eyes of the wearer of the contact lens 10, the contact lens 10 of the present invention preferably has high oxygen permeability. The oxygen permeability coefficient $[\times 10^{-11} (cm^2/sec) mLO_2/(mL \cdot hPa)]$ is preferably 50 to 2,000, more preferably 100 to 1,500, further preferably 150 to 1,000, and most preferably 200 to 700. When the oxygen permeability is excessively large, other physical properties such as mechanical properties may be adversely affected, which is not preferable. The oxygen permeability coefficient is measured with a test piece in a dry state.

In order to have high oxygen permeability, the contact lens 10 of the present invention preferably contains 5% by mass or more of silicon atoms in the substrate. The content of silicon atoms (% by mass) is calculated based on the amount of the substrate in a dry state (100% by mass). The silicon atom content in the substrate is preferably 5% by mass to 36% by mass, more preferably 7% by mass to 30% by mass, further preferably 10% by mass to 30% by mass, and most preferably 12% by mass to 26% by mass. When the content of silicon atoms is excessively high, the tensile elastic modulus may increase, which is not preferable.

The content of silicon atoms in the substrate can be measured by the following method. The sufficiently dried substrate is weighed in a platinum crucible and sulfuric acid is added to the substrate, followed by heating for forming ash with a hot plate and a burner. The ash is melted with sodium carbonate and water is added to dissolve the ash by heating. Thereafter, nitric acid is added to the resultant solution and the constant volume of the obtained solution is made with water. With respect to this solution, silicon atoms are measured by ICP emission spectroscopic analysis to determine the content in the substrate.

The substrate of the contact lens 10 of the present invention preferably contains a polymer of a component A being a polysiloxane compound having a plurality of polymerizable functional groups per molecule and having a number average molecular weight of 6,000 or more or a copolymer of the component A and a compound having a polymerizable functional group and being different from the component A as a main component. Here, the term "main component" means a component contained in an amount of 50% by mass or more based on the amount of the substrate in a dry state (100% by mass). In this specification, the polysiloxane compound refers to a compound having a bond represented by Si—O—Si—O—Si.

The number average molecular weight of the component A is preferably 6,000 or more. When the number average molecular weight of the component A is within this range, the low water content contact lens 10 having softness, excellent wearing feeling, and excellent mechanical properties such as bending resistance can be obtained. The number average molecular weight of the polysiloxane compound of the component A is preferably 8,000 or more because the low water content contact lens 10 having excellent mechanical properties such as bending resistance can be obtained. The number average molecular weight of the component A is preferably in a range of 8,000 to 100,000, more preferably in a range of 9,000 to 70,000, and further preferably in a range of 10,000 to 50,000. When the number average molecular weight of the component A is excessively low, the mechanical properties such as bending resistance tend to be lowered. In particular, when the number average molecular weight is less than 6,000, the bending resistance is low. When the number average molecular weight of component A is excessively high, softness and transparency tend to be lowered, which is not preferable.

The contact lens 10 of the present invention is an optical product and thus preferably has high transparency. As a criterion of transparency, a transparent state without turbidity at the time of visual observation is preferable. When the contact lens 10 is observed with a lens projector, a state where little or no turbidity is observed is preferable and a state where no turbidity is observed is most preferable.

The polydispersity (the value obtained by dividing the mass average molecular weight by the number average molecular weight) of the component A is preferably 6 or less, more preferably 3 or less, further preferably 2 or less, and most preferably 1.5 or less. When the polydispersity of the component A is low, the compatibility with other components is improved. This provides advantages such as improved transparency of the lens to be obtained, reduction in extractable components contained in the obtained lens, and reduction in a shrinkage ratio associated with lens molding. The shrinkage ratio associated with lens molding can be evaluated by the following formula.

Lens molding ratio=[Lens diameter]/[Diameter of cavity part of mold]

As the lens molding ratio becomes closer to 1, stable production of high quality lenses becomes easier. The molding ratio is preferably in a range of 0.85 to 2.0, more preferably in a range of 0.9 to 1.5, and most preferably in a range of 0.91 to 1.3.

In the present invention, the number average molecular weight of the component A is a number average molecular weight in terms of polystyrene measured by gel permeation chromatography (a GPC method) using chloroform as a solvent. The mass average molecular weight and the polydispersity (the value obtained by dividing the mass average molecular weight by the number average molecular weight) are also measured with the same manner. For other components, the number average molecular weight, the mass average molecular weight, and the polydispersity are measured with the same manner. In this specification, the mass average molecular weight may be represented by Mw and the number average molecular weight may be represented by Mn in some cases.

The component A is a polysiloxane compound having a plurality of polymerizable functional groups. The number of the polymerizable functional groups of the component A may be two or more per molecule. From the viewpoint that a softer (low elastic modulus) contact lens is easily obtained, the number of the polymerizable functional groups is preferably 2 per molecule. In particular, a structure having the polymerizable functional groups at both ends of the molecular chain is preferable.

As the polymerizable functional group of the component A, a radical polymerizable functional group is preferable and a polymerizable functional group having a carbon-carbon double bond is more preferable. Examples of preferable polymerizable functional groups include a vinyl group, an allyl group, a (meth)acryloyl group, an α-alkoxymethylacryloyl group, a maleic acid residue, a fumaric acid residue, an itaconic acid residue, a crotonic acid residue, an isocrotonic acid residue, and a citraconic acid residue. Among them, the (meth)acryloyl group is most preferable because the (meth)acryloyl group has high polymerizability.

In this specification, the term "(meth)acryloyl" represents both methacryloyl and acryloyl and terms such as "(meth)acrylic", "(meth)acrylate" and the like are the same meaning.

As the component A, a component having the structure of Formula (A1) is preferable.

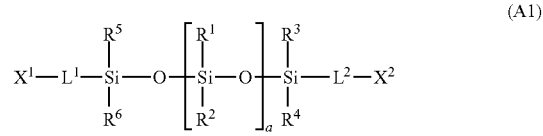

(A1)

In Formula (A1), $X^1$ and $X^2$ each independently represent a polymerizable functional group. $R^1$ to $R^6$ each independently represent a substituent selected from the group consisting of hydrogen, an alkyl group having 1 to 20 carbon atoms, a phenyl group, and a fluoroalkyl group having 1 to 20 carbon atoms. $L^1$ and $L^2$ each independently represent a divalent group. $a$ is the number of repetitions of siloxane units and represents an integer of 1 to 1,500. The structures of the respective siloxane units may be the same as or different from each other.

As the polymerizable functional group represented by $X^1$ and $X^2$, a radical polymerizable functional group is preferable and a polymerizable functional group having a carbon-carbon double bond is preferable. Examples of preferable polymerizable functional groups include a vinyl group, an allyl group, a (meth)acryloyl group, an α-alkoxymethylacryloyl group, a maleic acid residue, a fumaric acid residue, an itaconic acid residue, a crotonic acid residue, an isocrotonic acid residue, and a citraconic acid residue. Among them, the (meth)acryloyl group is most preferable because the (meth)acryloyl group has high polymerizability. In other words, the component A is most preferably a (meth)acrylic macromonomer.

Specific examples of suitable $R^1$ to $R^6$ include hydrogen; an alkyl group having 1 to 20 carbon atoms such as a methyl group, an ethyl group, a propyl group, an isopropyl group, a butyl group, a t-butyl group, a decyl group, a dodecyl group, and an octadecyl group; a phenyl group; a fluoroalkyl group having 1 to 20 carbon atoms such as a trifluoromethyl group, a trifluoroethyl group, a trifluoropropyl group, a tetrafluoropropyl group, a hexafluoroisopropyl group, a pentafluorobutyl group, a heptafluoropentyl group, a nonafluorohexyl group, a hexafluorobutyl group, a heptafluorobutyl group, an octafluoropentyl group, a nonafluoropentyl group, a dodecafluoroheptyl group, a tridecafluoroheptyl group, a dodecafluorooctyl group, a tridecafluorooctyl group, a hexadecafluorodecyl group, a heptadecafluorodecyl group, a tetrafluoropropyl group, a pentafluoropropyl group, a tetradecafluorooctyl group, a pentadecafluorooctyl group, an octadecafluorodecyl group, and a nonadecafluorodecyl group.

$L^1$ and $L^2$ each independently represent a divalent group and are preferably a divalent group having 1 to 20 carbon atoms. Among them, the groups represented by Formulas (LE1) to (LE12) are preferable because these groups have an advantage that the compound of Formula (A1) can be easily obtained with high purity. Among them, the group represented by Formula (LE1), (LE3), (LE9) or (LE11) is more preferable, the group represented by Formula (LE1) or (LE3) is further preferable, and a group represented by Formula (LE1) is most preferable. In Formulas (LE1) to (LE12), the left side is illustrated as the terminal bonded to the polymerizable functional group $X^1$ or $X^2$ and the right side is illustrated as the terminal bonded to the silicon atom.

| | |
|---|---|
| $OCH_2CH_2CH_2$ | (LE1) |
| $NHCH_2CH_2CH_2$ | (LE2) |
| $OCH_2CH_2NHCOOCH_2CH_2CH_2$ | (LE3) |
| $OCH_2CH_2NHCONHCH_2CH_2CH_2$ | (LE4) |
| $OCH_2CH_2CH_2CH_2$ | (LE5) |
| $NHCH_2CH_2CH_2CH_2$ | (LE6) |
| $OCH_2CH_2NHCOOCH_2CH_2CH_2CH_2$ | (LE7) |
| $OCH_2CH_2NHCONHCH_2CH_2CH_2CH_2$ | (LE8) |
| $OCH_2CH_2OCH_2CH_2CH_2$ | (LE9) |
| $NHCH_2CH_2OCH_2CH_2CH_2$ | (LE10) |
| $OCH_2CH_2NHCOOCH_2CH_2OCH_2CH_2CH_2$ | (LE11) |
| $OCH_2CH_2NHCONHCH_2CH_2OCH_2CH_2CH_2$ | (LE12) |

In Formula (A1), a is preferably 80 or more, more preferably 100 or more, more preferably 100 to 1,400, more preferably 120 to 950, and further preferably 130 to 700.

The component A of the present invention may be used singly or in combination of two or more kinds of the components A. As the other compound copolymerized with the component A, a component B that is a polymerizable monomer having a fluoroalkyl group is preferable. The component B has a water- and oil-repellent property due to a decrease in the critical surface tension caused by a fluoroalkyl group. This causes an effect of reducing contamination of the ophthalmic lens surface with components such as proteins and lipids in tear fluid. The component B also has the effect of providing a low water content contact lens having softness, excellent wearing feeling, and excellent mechanical properties such as bending resistance. Suitable specific examples of the fluoroalkyl group of component B include a fluoroalkyl group having 1 to 20 carbon atoms such as a trifluoromethyl group, a trifluoroethyl group, a trifluoropropyl group, a tetrafluoropropyl group, a hexafluoroisopropyl group, a pentafluorobutyl group, a heptafluoropentyl group, a nonafluorohexyl group, a hexafluorobutyl group, a heptafluorobutyl group, an octafluoropentyl group, a nonafluoropentyl group, a dodecafluoroheptyl group, a tridecafluoroheptyl group, a dodecafluorooctyl group, a tridecafluorooctyl group, a hexadecafluorodecyl group, a heptadecafluorodecyl group, a pentafluoropropyl group, a tetradecafluorooctyl group, a pentadecafluorooctyl group, an octadecafluorodecyl group, and a nonadecafluorodecyl group. The fluoroalkyl group of component B is more preferably a fluoroalkyl group having 2 to 8 carbon atoms such as a trifluoroethyl group, a tetrafluoropropyl group, a hexafluoroisopropyl group, an octafluoropentyl group, and a dodecafluorooctyl group and most preferably a trifluoroethyl group.

As the polymerizable functional group of the component B, a radical polymerizable functional group is preferable and a polymerizable functional group having a carbon-carbon double bond is more preferable. Examples of preferable polymerizable functional groups include a vinyl group, an allyl group, a (meth)acryloyl group, an α-alkoxymethylacryloyl group, a maleic acid residue, a fumaric acid residue, an itaconic acid residue, a crotonic acid residue, an isocrotonic acid residue, and a citraconic acid residue. Among them, the (meth)acryloyl group is most preferable because the (meth)acryloyl group has high polymerizability.

As the component B, the most preferable component is a fluoroalkyl (meth)acrylate ester because this component provides great effect of obtaining a low water content soft contact lens having excellent softness, wearing feeling, and mechanical properties such as bending resistance. Specific examples of such fluoroalkyl (meth)acrylate esters include trifluoroethyl (meth) acrylate, tetrafluoroethyl (meth) acrylate, trifluoropropyl (meth) acrylate, tetrafluoropropyl (meth) acrylate, pentafluoropropyl (meth) acrylate, hexafluorobutyl (meth) acrylate, hexafluoroisopropyl (meth) acrylate, heptafluorobutyl (meth) acrylate, octafluoropentyl (meth) acrylate, nonafluoropentyl (meth) acrylate, dodecafluoropentyl (meth) acrylate, dodecafluoroheptyl (meth) acrylate, dodecafluorooctyl (meth) acrylate, and tridecafluoroheptyl (meth)acrylate. Trifluoroethyl (meth)acrylate, tetrafluoroethyl (meth) acrylate, hexafluoroisopropyl (meth) acrylate, octafluoropentyl (meth) acrylate, and dodecafluorooctyl (meth)acrylate are preferably used. Trifluoroethyl (meth)acrylate is the most preferable fluoroalkyl (meth) acrylate ester. In the present invention, the component B may be used singly or in combination of two or more kinds of the components B.

The content of the component B in the copolymer is preferably 10 parts by mass to 500 parts by mass, more preferably 20 parts by mass to 400 parts by mass, and further preferably 20 parts by mass to 200 parts by mass relative to 100 parts by mass of the component A. When the amount of the component B to be used is excessively small, the obtained contact lens 10 tends to generate cloudiness or to provide insufficient mechanical properties such as bending resistance.

A copolymer formed by further copolymerizing a component different from the components A and B (hereinafter, referred to as a component C) in addition to the components A and B may be used as the copolymer used for the substrate.

As the component C, a component that lowers the glass transition temperature of the copolymer to room temperature or 0° C. or lower is preferable. These components lower the cohesive energy and thus have the effect of providing rubber elasticity and softness to the copolymer.

As the polymerizable functional group of the component C, a radical polymerizable functional group is preferable and a polymerizable functional group having a carbon-carbon double bond is more preferable. Examples of preferable polymerizable functional groups include a vinyl group, an allyl group, a (meth)acryloyl group, an α-alkoxymethylacryloyl group, a maleic acid residue, a fumaric acid residue, an itaconic acid residue, a crotonic acid residue, an isocrotonic acid residue, and a citraconic acid residue. Among them, the (meth)acryloyl group is most preferable because the (meth) acryloyl group has high polymerizability.

Suitable examples of the component C for improving softness and mechanical properties such as bending resistance include alkyl (meth)acrylate ester, preferably alkyl (meth)acrylate ester having 1 to 20 carbon atoms. Specific examples thereof include methyl (meth)acrylate, ethyl (meth)acrylate, n-propyl (meth)acrylate, n-butyl (meth) acrylate, tert-butyl (meth) acrylate, isobutyl (meth)acrylate, n-hexyl (meth)acrylate, n-octyl (meth)acrylate, 2-ethylhexyl (meth)acrylate, n-heptyl (meth)acrylate, n-nonyl (meth) acrylate, n-decyl (meth)acrylate, isodecyl (meth)acrylate, n-lauryl (meth)acrylate, tridecyl (meth)acrylate, n-dodecyl (meth) acrylate, cyclopentyl (meth) acrylate, cyclohexyl (meth)acrylate, and n-stearyl meth)acrylate. N-butyl (meth) acrylate, n-octyl (meth)acrylate, n-lauryl (meth)acrylate, and n-stearyl (meth)acrylate are more preferable. Among them, alkyl (meth)acrylate esters having an alkyl group having 1 to 10 carbon atoms are more preferable. When the carbon number of the alkyl group is excessively large, the transparency of the obtained lens may deteriorate, which is not preferable.

In addition to the component A, a copolymer obtained by further copolymerizing a component M may be used as the copolymer used for the substrate. The component M is "a monofunctional monomer having one polymerizable functional group per molecule and a siloxanyl group". In this specification, the term "siloxanyl group" means a group having a Si—O—Si bond.

The siloxanyl group in the component M is preferably linear. When the siloxanyl group is linear, the shape recoverability of the obtained low water content soft contact lens 10 is improved. Here, the term "linear chain" means a structure represented by a single linearly connected Si—(O—Si)$_{n-1}$—O—Si bond starting from a silicon atom bonded to the group having the polymerizable group (here, n represents an integer of 2 or more). In order to obtain satisfactory shape recoverability of the obtained contact lens 10, n is preferably an integer of 3 or more, more preferably 4 or more, further preferably 5 or more, and most preferably 6 or more. Here, the term "siloxanyl group is linear" means that the siloxanyl group has the above-described linear structure and does not have a Si—O—Si bond that does not satisfy the conditions of the linear structure.

The substrate preferably contains a copolymer containing the component M having a number average molecular weight of 300 to 120,000 as a main component. Here, the term "main component" means a component contained in an amount of 50% by mass or more based on the mass (100% by mass) of the substrate in a dry state.

The number average molecular weight of the component M is preferably 300 to 120,000. When the number average molecular weight of the component M is in this range, a substrate having excellent wearing feeling with softness (low elastic modulus) and excellent mechanical properties such as bending resistance can be obtained. The number average molecular weight of the component M is preferably 500 or more because the substrate having excellent mechanical properties such as bending resistance and excellent shape recoverability can be obtained. The number average molecular weight of the component M is more preferably in the range of 1,000 to 25,000 and further preferably in the range of 5,000 to 15,000. When the number average molecular weight of the component M is excessively low, the mechanical properties such as bending resistance and shape recovery tend to be low. In particular, when the number average molecular weight is less than 500, the bending resistance and the shape recoverability may be low. When the number average molecular weight of the component M is excessively high, softness and transparency tend to deteriorate, which is not preferable.

As the polymerizable functional group of the component M, a radical polymerizable functional group is preferable and a polymerizable functional group having a carbon-carbon double bond is more preferable. Examples of preferable polymerizable functional groups include a vinyl group, an allyl group, a (meth)acryloyl group, an α-alkoxymethylacryloyl group, a maleic acid residue, a fumaric acid residue, an itaconic acid residue, a crotonic acid residue, an isocrotonic acid residue, and a citraconic acid residue. Among them, the (meth)acryloyl group is most preferable because the (meth)acryloyl group has high polymerizability.

As the component M, a component having the structure of Formula (ML1) is preferable.

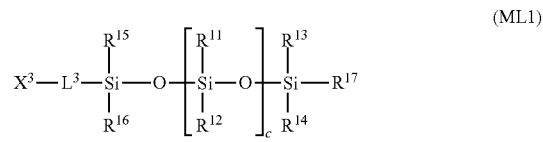

(ML1)

In Formula (ML1), $X^3$ represents a polymerizable functional group. $R^{11}$ to $R^{17}$ each independently represent a substituent selected from the group consisting of hydrogen, an alkyl group having 1 to 20 carbon atoms, a phenyl group, and a fluoroalkyl group having 1 to 20 carbon atoms. $L^3$ represents a divalent group. c represents an integer of 0 to 700.

As $X^3$, a radical polymerizable functional group is preferable and a polymerizable functional group having a carbon-carbon double bond is preferable. Examples of preferable polymerizable functional groups include a vinyl group, an allyl group, a (meth)acryloyl group, an α-alkoxymethylacryloyl group, a maleic acid residue, a fumaric acid residue, an itaconic acid residue, a crotonic acid residue, an isocrotonic acid residue, and a citraconic acid residue. Among them, the (meth)acryloyl group is most preferable because the (meth)acryloyl group has high polymerizability.

The polymerizable functional group of the component M is more preferably copolymerizable with the polymerizable functional group of the component A because the low water content soft contact lens 10 having excellent mechanical properties is easily obtained. The polymerizable functional group of the component M is further preferably the same as the polymerizable functional group of the component A because the low water content soft contact lens 10 having good surface properties is easily obtained by uniformly copolymerizing the component M and the component A.

Specific examples of suitable $R^{11}$ to $R^{17}$ include hydrogen; an alkyl group having 1 to 20 carbon atoms such as a methyl group, an ethyl group, a propyl group, an isopropyl group, a butyl group, a t-butyl group, a decyl group, a dodecyl group, and an octadecyl group; a phenyl group; a fluoroalkyl group having 1 to 20 carbon atoms such as a trifluoromethyl group, a trifluoroethyl group, a trifluoropropyl group, a tetrafluoropropyl group, a hexafluoroisopropyl group, a pentafluorobutyl group, a heptafluoropentyl group, a nonafluorohexyl group, a hexafluorobutyl group, a heptafluorobutyl group, a octafluoropentyl group, a nonafluoropentyl group, a dodecafluoroheptyl group, a tridecafluoroheptyl group, a dodecafluorooctyl group, a tridecafluorooctyl group, a hexadecafluorodecyl group, a heptadecafluorodecyl group, a pentafluoropropyl group, a tetradecafluorooctyl group, a pentadecafluorooctyl group, an octadecafluorodecyl group, and a nonadecafluorodecyl group. Among them, hydrogen and the methyl group are more preferable and the methyl group is most preferable from the viewpoint of providing excellent mechanical properties and high oxygen permeability to the low water content soft lens.

$L^3$ is preferably a divalent group having 1 to 20 carbon atoms. Among them, the groups represented by Formulas (LE1) to (LE12) are preferable because these groups have an advantage that the compound of Formula (ML1) can be easily obtained with high purity. Among them, the groups represented by Formula (LE1), (LE3), (LE9) and (LE11) are more preferable, the groups represented by Formula (LE1) and (LE3) are further preferable, and a group represented by Formula (LE1) is most preferable. As Formulas (LE1) to (LE12), the left side is illustrated as the terminal bonded to the polymerizable functional group $X^3$ and the right side is illustrated as the terminal bonded to the silicon atom.

$$OCH_2CH_2CH_2 \quad (LE1)$$

$$NHCH_2CH_2CH_2 \quad (LE2)$$

$$OCH_2CH_2NHCOOCH_2CH_2CH_2 \quad (LE3)$$

$$OCH_2CH_2NHCONHCH_2CH_2CH_2 \quad (LE4)$$

$$OCH_2CH_2CH_2CH_2 \quad (LE5)$$

$$NHCH_2CH_2CH_2CH_2 \quad (LE6)$$

$$OCH_2CH_2NHCOOCH_2CH_2CH_2CH_2 \quad (LE7)$$

$$OCH_2CH_2NHCONHCH_2CH_2CH_2CH_2 \quad (LE8)$$

$$OCH_2CH_2OCH_2CH_2CH_2 \quad (LE9)$$

$$NHCH_2CH_2OCH_2CH_2CH_2 \quad (LE10)$$

$$OCH_2CH_2NHCOOCH_2CH_2OCH_2CH_2CH_2 \quad (LE11)$$

$$OCH_2CH_2NHCONHCH_2CH_2OCH_2CH_2CH_2 \quad (LE12)$$

In Formula (ML1), c is preferably 3 or more, more preferably 10 or more, more preferably 10 to 500, more preferably 30 to 300, and further preferably 50 to 200.

In the substrate of the contact lens 10 of the present invention, the component M may be used singly or in combination of two or more kinds of the components M.

By containing an appropriate amount of the component M in the substrate of the contact lens 10 of the present invention, the crosslinking density is decreased to increase the degree of freedom of the polymer and thus the substrate having a moderately soft and low elastic modulus can be achieved. On the other hand, when the content of the component M is excessively low, the crosslinking density becomes higher and the substrate becomes harder. When the content of the component M is excessively high, the substrate becomes excessively soft and easily breaks, which is not preferable.

In the substrate of the contact lens 10 of the present invention, the mass ratio of the component M to the component A is 5 parts by mass to 200 parts by mass, more preferably 7 parts by mass to 150 parts by mass, and most preferably 10 parts by mass to 100 parts by mass of the component M relative to 100 parts by mass of the component A. When the content of the component M is less than 5 parts by mass relative to 100 parts by mass of the component A, the crosslink density increases and the substrate becomes harder. On the other hand, when the content of the component M exceeds 200 parts by mass relative to 100 parts by mass of the component A, the substrate becomes excessively soft and easily breaks, which is not preferable.

In order to improve the mechanical properties, the surface wettability, the dimensional stability of the lens, and the like, the contact lens 10 of the present invention can copolymerize the following monomers to a substrate, if desired.

Examples of the monomer for improving the mechanical properties include aromatic vinyl compounds such as styrene, tert-butylstyrene, and α-methylstyrene.

Examples of the monomers for improving the surface wettability include methacrylic acid, acrylic acid, itaconic acid, 2-hydroxyethyl methacrylate, 2-hydroxyethyl acrylate, 2-hydroxypropyl methacrylate, 2-hydroxypropyl acrylate, glycerol methacrylate, polyethylene glycol methacrylate, N,N-dimethylacrylamide, N-methylacrylamide, dimethylaminoethyl methacrylate, methylenebisacrylamide, diacetone acrylamide, N-vinylpyrrolidone, N-vinylcaprolactam, N-vinylacetamide, and N-vinyl-N-methyl acetamide. Among them, the monomers having an amide group such as N,N-dimethylacrylamide, N-methylacrylamide, dimethylaminoethyl methacrylate, methylenebisacrylamide, diacetone acrylamide, N-vinylpyrrolidone, N-vinylcaprolactam, N-vinylacetamide, and N-vinyl-N-methyl acetamide are preferable.

Examples of the monomers for improving the dimensional stability of the contact lens 10 include ethylene glycol dimethacrylate, diethylene glycol dimethacrylate, triethylene glycol dimethacrylate, polyethylene glycol dimethacrylate, trimethylolpropane trimethacrylate, pentaerythritol tetramethacrylate, bisphenol A dimethacrylate, vinyl methacrylate, acryl methacrylate and acrylates corresponding to these methacrylates, divinylbenzene, and triallyl isocyanurate.

The component C of the present invention may be used singly or in combination of two or more kinds of the components C.

The amount of the component C to be used is preferably 0.001 part by mass to 400 parts by mass, more preferably 0.01 part by mass to 300 parts by mass, further preferably 0.01 part by mass to 200 parts by mass, and most preferably 0.01 part by mass to 30 parts by mass relative to 100 parts by mass of the component A. When the amount of component C to be used is excessively small, the expected effect of the component C is difficult to obtain. When the amount of component C to be used is excessively large, cloudiness tends to occur and mechanical properties such as bending resistance tend to become insufficient in the obtained contact lens.

The contact lens 10 of the present invention may further include components such as an ultraviolet absorber, a coloring matter, a coloring agent, a wetting agent, a slipping agent, a medicine and a nutritional supplement component, a compatibilizing component, an antibacterial component, a releasing agent, and the like in the substrate. Any of the above-described components may be included in a non-reactive form or a copolymerized form.

When the ultraviolet absorber is included, the eyes of the wearer of the contact lens can be protected from harmful ultraviolet rays. When the coloring agent is included, the ophthalmic lens is colored to facilitate identification and thus convenience at the time of handling is improved.

When the above components are copolymerized, that is, when an ultraviolet absorber having a polymerizable group, a coloring agent having a polymerizable group, or the like is used, the component is copolymerized and immobilized to the substrate and thus the possibility of elution is reduced, which is preferable.

The substrate preferably includes a component selected from the ultraviolet absorber and the coloring agent and two or more components C (hereinafter, referred to as components Ck) other than these components. In this case, as the components Ck, at least one kind of a component is preferably selected from an alkyl (meth)acrylate ester having 1 to 10 carbon atoms and at least one kind of a component is preferably selected from the monomers for improving the surface wettability. By using two or more kinds of the components Ck, the affinity with the ultraviolet absorber and the coloring agent is enhanced and thus the transparent substrate is easily obtained.

When the ultraviolet absorber is used, the amount to be used is preferably 0.01 part by mass to 20 parts by mass, more preferably 0.05 part by mass to 10 parts by mass, and further preferably 0.1 part by mass to 2 parts by mass relative to 100 parts by mass of the component A. When the coloring agent is used, the amount to be used is preferably 0.00001 part by mass to 5 parts by mass, more preferably 0.0001 part by mass to 1 part by mass, and further preferably 0.001 part by mass to 0.5 mass part relative to 100 parts by mass of the component A. When the content of the ultraviolet absorber or the coloring agent is excessively small, the ultraviolet absorbing effect or the coloring effect is difficult to obtain. On the other hand, when the content of these components are excessively large, these components are difficult to dissolve in the substrate. Each amount of the components Ck to be used is preferably 0.1 part by mass to 100 parts by mass, more preferably 1 part by mass to 80 parts by mass, and further preferably 2 part by mass to 50 parts by mass relative to 100 parts by mass of the component A. When the amount of the component Ck to be used is excessively small, affinity with the ultraviolet absorber and the coloring agent tends to be insufficient and thus the transparent substrate tends to be difficult to obtain. When the amount of component Ck to be used is excessively large, white turbidity tends to appear in the contact lens 10 and mechanical properties such as bending resistance tend to be insufficient, which is not preferable.

In the substrate of the contact lens 10 of the present invention, the degree of crosslinking is preferably in a range of 2.0 to 18.3. The degree of crosslinking is represented by Formula (Q1).

$$\text{Degree of crosslinking} = \frac{\sum_{n=1}^{\infty} \{Qn \times (n-1)\}}{\sum_{n=1}^{\infty} Wn} \quad (Q1)$$

In Formula (Q1), Qn represents the total millimolar amount of the monomers having n polymerizable groups per molecule and Wn represents the total mass (kg) of monomers having n polymerizable groups per molecule. When the molecular weight of the monomer has a distribution, the millimolar amount is calculated using the number average molecular weight.

When the degree of crosslinking of the substrate according to the present invention is less than 2.0, the substrate is excessively soft and thus handling becomes difficult, while when the degree of crosslinking is more than 18.3, the substrate is excessively hard and thus wearing feeling tends to deteriorate, which is not preferable. A more preferable range of the degree of crosslinking is 3.5 to 16.0, a further preferable range is 8.0 to 15.0, and the most preferable range is 9.0 to 14.0.

As a method for producing the substrate of the contact lens 10 according to the present invention, that is, a lens-shaped molded body, known methods can be used. For example, a method for once obtaining a round bar or plate-shaped polymer and processing the polymer into a desired shape by a cutting process or the like, a mold polymerization method, a spin cast polymerization method, or the like can be used. When the lens is obtained by the cutting process, freezing cutting at low temperature is suitable.

As one example, a method for producing an ophthalmic lens by polymerizing a raw material composition containing the component A using a mold polymerization method will be described below. First, the raw material composition is filled in a cavity between two mold members having fixed shapes. Examples of the material of the mold member include a resin, a glass, a ceramic, and a metal. When photopolymerization is carried out, an optically transparent material is preferable and thus the resin or the glass is preferably used. Depending on the shape of the mold member and the properties of the raw material composition, a gasket may be used to provide a certain thickness to the ophthalmic lens and to prevent liquid leakage of the raw material composition filled in the cavity. The mold filled with the raw material composition in the cavity is irradiated with active light rays such as ultraviolet rays, visible light rays or a combination thereof or heated in an oven, a liquid vessel, or the like, whereby the filled raw material composition is polymerized. A method in which two kinds of polymerization methods are used in combination may be employed. In other words, the raw material composition can be thermally polymerized after the photopolymerization, or photopolymerized after the thermal polymerization. As a specific aspect of the photopolymerization, the light containing ultraviolet rays emitted from a light source such as a mercury lamp or ultraviolet lamp (for example, FL15BL, manufactured by Toshiba Corporation) is used for irradiation for a short period of time (usually 1 hour or less). When the thermal polymerization is carried out, conditions in which the temperature of the raw material composition is gradually raised from around room temperature to a temperature of 60° C. to 200° C. over several hours to several tens hours are preferable in order to maintain the optical uniformity and quality of the ophthalmic lens and to enhance reproducibility.

In the polymerization, it is preferable that a thermal polymerization initiator or a photopolymerization initiator represented by a peroxide or an azo compound be added in order to facilitate polymerization. When the thermal polymerization is carried out, the thermal polymerization initiator having optimum decomposition characteristics at a desired reaction temperature is selected. Generally, an azo type initiator and a peroxide type initiator having a 10-hour half-life temperature of 40° C. to 120° C. are suitable. Examples of the photopolymerization initiator when the photopolymerization is carried out include a carbonyl compound, a peroxide, an azo compound, a sulfur compound, a halogen compound, and a metal salt. These polymerization initiators are used singly or in combination. The amount of the polymerization initiator is preferably up to 5% by mass relative to the polymerization mixture.

At the time of polymerizing, a polymerization solvent can be used. As the solvent, various organic solvents and inorganic solvents are applicable. Examples of the solvent include water; alcohol solvents such as methyl alcohol, ethyl alcohol, normal propyl alcohol, isopropyl alcohol, normal butyl alcohol, isobutyl alcohol, t-butyl alcohol, t-amyl alcohol, tetrahydrolinalool, ethylene glycol, diethylene glycol, triethylene glycol, tetraethylene glycol, and polyethylene glycol; glycol ether solvents such as methyl cellosolve, ethyl cellosolve, isopropyl cellosolve, butyl cellosolve, propylene glycol monomethyl ether, diethylene glycol monomethyl ether, triethylene glycol monomethyl ether, polyethylene glycol monomethyl ether, ethylene glycol dimethyl ether, diethylene glycol dimethyl ether, triethylene glycol dimethyl ether, and polyethylene glycol dimethyl ether; ester solvents such as ethyl acetate, butyl acetate, amyl acetate, ethyl lactate, and methyl benzoate; aliphatic hydrocarbon solvents such as normal hexane, normal heptane, and normal octane; alicyclic hydrocarbon solvents such as cyclohexane and ethylcyclohexane; ketone solvents such as acetone, methyl ethyl ketone, and methyl isobutyl ketone; aromatic hydrocarbon solvents such as benzene, toluene, and xylene; and petroleum solvents. These solvents may be used singly or may be used in combination of two or more of the solvents.

For all of the above-described items defined in the numerical value ranges in this specification, any numerical value ranges combining any numerical values such as the upper limit, the preferable upper limit, and the more preferable upper limit in each of the above items with any numerical values such as the lower limit, the preferable lower limit, or the more preferable lower limit in each of the above items may be employed.

EXAMPLE

Hereinafter, the present invention will be specifically described with reference to Examples. The present invention, however, is not limited by Examples.

Reference Example 1

Polydimethylsiloxane having methacryloyl groups at both terminals (FM7726, manufactured by JNC Corporation, the compound of Formula (M2), mass average molecular weight 29,000, and number average molecular weight 26,000) (28 parts by mass) as the component A, polysiloxane having a methacryloyl group at one terminal (FM 0721, manufactured by JNC Corporation, the compound of Formula (M4), mass average molecular weight 6,600, and number average molecular weight 6,300) (7 parts by mass) as the component M, trifluoroethyl acrylate ("Viscoat (registered trademark)" 3F, manufactured by Osaka Organic Chemical Industry Ltd.) (57.9 parts by mass) as the component B, 2-ethylhexyl acrylate (7 parts by mass) as the component C, dimethylaminoethyl acrylate (0.1 part by mass) as the component C, an ultraviolet absorber having a polymerizable group (RUVA-93, manufactured by Otsuka Chemical Co., Ltd.) (0.5 part by mass) as the component C, a coloring agent (RB246, manufactured by Arran Chemical Company) (0.01 part by mass) as the component C, a polymerization initiator "Irgacure (registered trademark)" 819 (0.5 part by mass, manufactured by Ciba Specialty Chemicals Co., Ltd.), and t-amyl alcohol (10 parts by mass) were mixed and stirred. The resultant mixture was filtered through a membrane filter (pore size: 0.45 μm) and insoluble matters were removed to give a monomer mixture. The monomer mixture was injected into a mold for a contact lens of the front curve side, which was made of transparent resin (base curve side: polypropylene and front curve side: polypropylene) in Examples 1 to 9 or Comparative examples 1 to 4 listed in Table 1. Each molds for the contact lens of the base curve side, which have the shapes of Examples 1 to 9 or Comparative Examples 1 to 4 listed in Table 1, was fitted with the mold for the contact lens of the front curve side and thereafter the fitted mold was irradiated with light (wavelength: 405 nm (±5 nm), illuminance: 0.8 mW/cm², 30 minutes) to polymerize the monomer mixture. After the polymerization, the mold of the front curve side was peeled off with tweezers and thereafter the contact lens with the mold of the base curve side was immersed in a 100% by mass isopropyl alcohol solution to peel off the molded body having a contact lens shape from the mold. The molded body thus obtained was immersed in a 100% by mass isopropyl alcohol solution at 60° C. for 2 hours to remove the unpolymerized monomer. The obtained contact lens shaped molded body was gently washed with a new 100% by mass isopropyl alcohol solution and dried overnight by air at room temperature (23° C.)

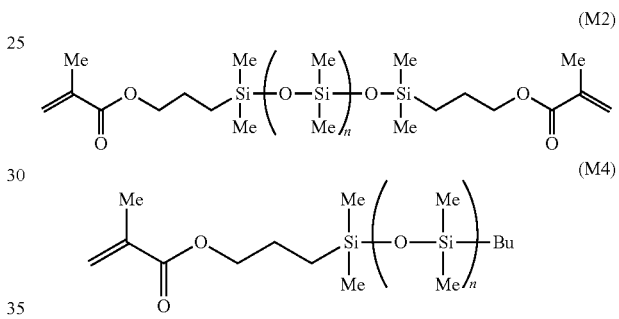

Reference Example 2

A commercial silicone rubber "SR-151" (registered trademark) (manufactured by TIGERS POLYMER CORPORATION) was formed by extrusion into a contact lens shapes of each of Comparative Examples 5 to 7 listed in Table 1.

Reference Example 3

A commercial silicone rubber "SR-70" (registered trademark) (manufactured by TIGERS POLYMER CORPORATION) was formed by extrusion into a contact lens shape of Comparative Examples 8 listed in Table 1.

Reference Example 4

Preparation of Coating Solution
<PAA Solution>
Polyacrylic acid ("Sokalan" (registered trademark) PA 110S", manufactured by BASF SE, mass average molecular weight 250,000) was dissolved in pure water to prepare a 1.2% by mass aqueous solution.
<PEI Solution>
Polyethyleneimine ("PEI70000" (registered trademark), manufactured by Junsei Chemical Co., Ltd., mass average molecular weight: 750,000) was dissolved in pure water to prepare a 1% by mass aqueous solution.
<p(DMAA/AA) Solution>
N,N-dimethylacrylamide/acrylic acid ("TEARS91" (registered trademark), manufactured by Osaka Organic Chemical Industry Ltd., mass average molecular weight 200,000) was dissolved in pure water to prepare a 0.1% by mass aqueous solution.

Examples 1 to 5 and Comparative Example 1 to 4

The molded body obtained in Reference Example 1 was immersed in the PAA solution prepared in Reference Example 4 at room temperature (23° C.) for 30 minutes and thereafter rinsed gently with pure water in a beaker. The molded body was transferred to a beaker containing fresh pure water and gently rinsed and this operation was repeated twice. Subsequently, the same operation was repeated in the order of the PEI solution and the p(DMAA/AA) solution prepared in Reference Example 4. Thereafter, the coated molded body was immersed in the phosphate buffer solution in the sealed vial and the vial was autoclaved (LSX-300, Tommy Seiko Co., Ltd.) at 121° C. for 30 minutes. The obtained molded body had a tensile elastic modulus of 0.6 MPa, an elongation of 1,000%, and a water content of 0.2%.

Comparative Examples 5 to 7

The molded body obtained in Reference Example 2 was immersed in the PAA solution prepared in Reference Example 4 at room temperature (23° C.) for 30 minutes and thereafter rinsed gently with pure water in a beaker. The molded body was transferred to a beaker containing fresh pure water and gently rinsed and this operation was repeated twice. Subsequently, the same operation was repeated in the order of the PEI solution and the p(DMAA/AA) solution prepared in Reference Example 4. Thereafter, the coated molded body was immersed in the phosphate buffer solution in the sealed vial and the vial was autoclaved (LSX-300, Tommy Seiko Co., Ltd.) at 121° C. for 30 minutes. The obtained molded body had a tensile elastic modulus of 10.8 MPa, an elongation of 480%, and a water content of 0.2%.

Comparative Example 8

The molded body obtained in Reference Example 3 was immersed in the PAA solution prepared in Reference Example 4 at room temperature (23° C.) for 30 minutes and thereafter rinsed gently with pure water in a beaker. The molded body was transferred to a beaker containing fresh pure water and gently rinsed and this operation was repeated twice. Subsequently, the same operation was repeated in the order of the PEI solution and the p(DMAA/AA) solution prepared in Reference Example 4. Thereafter, the coated molded body was immersed in the phosphate buffer solution in the sealed vial and the vial was autoclaved (LSX-300, Tommy Seiko Co., Ltd.) at 121° C. for 30 minutes. The obtained molded body had a tensile elastic modulus of 7.1 MPa, an elongation of 290%, and a water content of 0.2%.

Example 8

Using the $CO_2$ laser (manufactured by MEIKO ELECTRONICS Co., Ltd.), eight through holes having a diameter of 0.3 mm were formed at equal intervals in the region of the intermediate part 2 (FIG. 1) in the molded body obtained in Reference Example 1. Each position of the center of the hole was 9.75 mm away from the center of the contact lens. The obtained molded body was immersed in the PAA solution prepared in Reference Example 4 at room temperature (23° C.) for 30 minutes and thereafter rinsed gently with pure water in a beaker. The molded body was transferred to a beaker containing fresh pure water and gently rinsed and this operation was repeated twice. Subsequently, the same operation was repeated in the order of the PEI solution and the p(DMAA/AA) solution prepared in Reference Example 4. Thereafter, the coated molded body was immersed in the phosphate buffer solution in the sealed vial and the vial was autoclaved (LSX-300, manufactured by Tommy Seiko Co., Ltd.) at 121° C. for 30 minutes. The obtained molded body had a tensile elastic modulus of 0.6 MPa, an elongation of 1,000%, and a water content of 0.2%.

Example 9

With a punching device (manufactured by Kudou Electronics Co., Ltd.), four through holes having a diameter of 0.4 mm were formed at equal intervals in the region of the intermediate part 2 (FIG. 1) in the molded body obtained in Reference Example 1. Each position of the center of the hole was 9.75 mm away from the center of the contact lens. The obtained molded body was immersed in the PAA solution prepared in Reference Example 4 at room temperature (23° C.) for 30 minutes and thereafter rinsed gently with pure water in a beaker. The molded body was transferred to a beaker containing fresh pure water and gently rinsed and this operation was repeated twice. Subsequently, the same operation was repeated in the order of the PEI solution and the p(DMAA/AA) solution prepared in Reference Example 4. Thereafter, the coated molded body was immersed in the phosphate buffer solution in the sealed vial and the vial was autoclaved (manufactured by LSX-300, Tommy Seiko Co., Ltd.) at 121° C. for 30 minutes. The obtained molded body had a tensile elastic modulus of 0.6 MPa, an elongation of 1,000%, and a water content of 0.2%.

Evaluation of Wearing Feeling and Stability on the Eyeball

The lenses prepared in Examples 1 to 9 and Comparative Examples 1 to 8 were worn by wearers for 3.5 hours to 8 hours and a lens attachment property, wearing feeling, and stability on the eyeball were evaluated.

Attachment Property

◯: The movement of the lens can be detected at blinking

Δ: The lens moves by lightly pressing the lens from above the lower eyelid and pushing the lens upward x: The lens does not move even when the lens is lightly pressed from above the lower eyelid and pushed upward Wearing Feeling ◯: In the case where the wearer does not feel the lens as a foreign body and has excellent wearing feeling Δ: In the case where the lens is felt as foreign body but there is no trouble in wearing x: In the case where the lens is felt as a foreign body in such a degree that the lens cannot be worn Stability on Eyeball ◯: In the case where the lens is stably maintained at the center of the eye at the time of blinking Δ: In the case where the lens is slightly displaced but is not reached the to the pupil x: In the case where the lens falls off or is reached to the pupil The results are listed in Table 1. When the contact lenses of Examples 1 to 3, 6 and 7 to 9 were worn, attachment did not occur and both wearing feeling and stability on the eyeball were excellent. When the contact lenses of Examples 4 and 5 were worn, no attachment occurred but the stability was poor due to the small outer diameter.

On the other hand, when the contact lenses of Comparative Examples 1 to 4, 7, and 8 were worn, attachment occurred due to the single radius of curvature. In particular, the contact lens of Comparative Example 2 has the same outer diameter and sagittal depth as in Example 1 but the lens was attached onto the cornea due to the single radius of curvature. In the contact lenses of Comparative Examples 5 and 6, the radius of curvature, the outer diameter, and the sagittal depth at the central part are the same as those of Examples 1 and 2, respectively. The elastic modulus of the contact lenses of Comparative Example 5 and 6, however, was excessively high and thus wearing feeling was poor and lens movement and stability were also not excellent.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| | Worn lens molded body | Reference Example 1 | Reference Example 1 | Reference Example 1 | Reference Example 1 | Reference Example 1 | Reference Example 1 | Reference Example 1 | Reference Example 1 | Reference Example 1 |
| | Outer diameter (mm) | 13.0 | 13.5 | 13.5 | 12.5 | 11.5 | 13.0 | 13.5 | 13.5 | 13.5 |
| Central part 1 | Radius of curvature (mm) | 10.0 | 10.0 | 11.7 | 10.2 | 10.5 | 10.0 | 10.0 | 10.0 | 10.0 |
| | Inner diameter B (central part) (mm) | 9.0 | 9.0 | 9.0 | 8.5 | 8.0 | 9.0 | 9.0 | 9.0 | 9.0 |
| Intermediate part 2 | Radius of curvature (mm) | 7.7 | 8.1 | 7.9 | 7.6 | 7.2 | 7.7 | 8.1 | 8.1 | 8.1 |
| | Width of intermediate part C (mm) | 1.0 | 1.5 | 1.5 | 1.0 | 0.9 | 1.0 | 1.5 | 1.5 | 1.5 |
| Outer edge part 3 | Radius of curvature (mm) | 8.8 | 8.8 | 9.1 | 8.8 | 8.8 | 8.8 | 8.8 | 8.8 | 8.8 |
| | Width of outer edge part D (mm) | 1.0 | 0.75 | 0.75 | 1.0 | 0.9 | 1.0 | 0.75 | 0.75 | 0.75 |
| Sagittal depth F1 (mm) | | 2.78 | 3.05 | 2.90 | 2.52 | 2.08 | 2.78 | 3.05 | 3.05 | 3.05 |
| Sagittal depth F2 (mm) | | 2.97 | 3.27 | 3.10 | 2.69 | 2.20 | 2.97 | 3.27 | 3.27 | 3.27 |
| Sagittal depth E (mm) | | 2.87 | 3.15 | 2.99 | 2.6 | 2.15 | 2.87 | 3.15 | 3.15 | 3.15 |
| Results | Attachment property | o | o | o | o | o | o | o | o | o |
| | Wearing feeling | o | o | Δ | o | o | o | o | Δ | Δ |
| | Stability | o | o | Δ | x | x | o | o | o | o |

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| | Worn lens molded body | Reference Example 1 | Reference Example 1 | Reference Example 1 | Reference Example 1 | Reference Example 2 | Reference Example 2 | Reference Example 2 | Reference Example 3 |
| | Outer diameter (mm) | 14.0 | 13.0 | 13.0 | 13.5 | 13.0 | 13.5 | 14.0 | 14.0 |
| Central part 1 | Radius of curvature (mm) | 8.8 | 8.8 | 9.1 | 8.8 | 10.0 | 10.0 | 8.8 | 8.8 |
| | Inner diameter B (central part) (mm) | 14.0 | 13.0 | 13.0 | 13.5 | 9.0 | 9.0 | 14.0 | 14.0 |
| Intermediate part 2 | Radius of curvature (mm) | | | | | 7.7 | 8.1 | | |
| | Width of intermediate part C (mm) | | | | | 1.0 | 1.5 | | |
| Outer edge part 3 | Radius of curvature (mm) | | | | | 8.8 | 8.8 | | |
| | Width of outer edge part D (mm) | | | | | 1.0 | 0.75 | | |
| Sagittal depth F1 (mm) | | 3.34 | 2.78 | 2.65 | 3.05 | 2.78 | 3.05 | 3.34 | 3.34 |
| Sagittal depth F2 (mm) | | 3.60 | 2.97 | 2.82 | 3.27 | 2.97 | 3.27 | 3.60 | 3.60 |
| Sagittal depth E (mm) | | 3.47 | 2.87 | 2.73 | 3.15 | 2.87 | 3.15 | 3.47 | 3.47 |
| Results | Attachment property | x | x | x | x | Δ | Δ | Δ | x |
| | Wearing feeling | o | Δ | Δ | o | x | x | x | x |
| | Stability | o | Δ | Δ | x | Δ | Δ | Δ | Δ |

REFERENCE SIGNS LIST

A Outer Diameter of Contact Lens
B Inner Diameter of Central Part
C Width of Intermediate Part
D Width of Outer Edge Part
E Sagittal Depth of Contact Lens of Present Invention
F, F1, F2 Sagittal Depth of Contact Lens of Conventional Art
1 Central Part
2 Intermediate Part
3 Outer Edge Part
4, 5, 6 Base Curve
7 Eyeball
10 Contact Lens of Present Invention
10', 10'-1, 10'-2 Contact Lens of Conventional Art

The invention claimed is:

1. A soft contact lens comprising:
a circular central part positioned at a center of the soft contact lens;
an intermediate part positioned at an outer peripheral side of the central part and forming an annular shape having a center coaxial with the central part; and
an outer edge part positioned at an outer peripheral side of the intermediate part and forming an annular shape having a center coaxial with the central part, wherein
respective radii of curvature of the central part X, the intermediate part Y, and the outer edge part Z are different from each other, and a sagittal depth E of the soft contact lens, having a diameter A, is within a range of F1 to F2,
wherein F1 is a sagittal depth of a first contact lens having a uniform radius of curvature of Z+0.2 mm and a diameter A, and F2 is a sagittal depth of a second contact lens having a uniform radius of curvature of Z−0.2 mm and a diameter A,
wherein a tensile elastic modulus of the whole soft contact lens is in the range of 0.1 MPa to 0.6 MPa,
wherein a substrate of the soft contact lens comprises a copolymer of the components A and M, and wherein:
(i) the component A is a polysiloxane compound having a plurality of polymerizable functional groups per molecule and a number average molecular weight of 6,000 or more, and
(ii) the component M is a monofunctional monomer having one polymerizable functional group per molecule and a siloxanyl group.

2. The soft contact lens according to claim 1, wherein the radius of curvature of the intermediate part is smaller than the radii of curvature of the central part and is smaller than the radii of curvature of the outer edge part.

3. The soft contact lens according to claim 1, wherein the radii of curvature of the central part, the intermediate part, and the outer edge part satisfy the following formula
Radius curvature of central part>Radius of curvature of outer edge part>Radius of curvature of intermediate part.

4. The soft contact lens according to claim 1, wherein the radius of curvature of the outer edge part is 60% to 97% relative to the radius of curvature of the central part and the radius of curvature of the intermediate part is 60% to 98% relative to the radius of curvature of the outer edge part.

5. The soft contact lens according to claim 1, wherein at least one through hole penetrating from a front surface to a back surface of the soft contact lens is provided in the soft contact lens.

6. The soft contact lens according to claim 5, wherein the through hole is provided in the intermediate part.

7. The soft contact lens according to claim 1, wherein the outer diameter A is in the range of 13 mm to 15 mm.

8. The soft contact lens according to claim 1, wherein the radius of curvature the outer edge part Z is in the range of 8.0 mm to 9.5 mm.

9. The soft contact lens according to claim 1, wherein the component A is a polysiloxane compound represented by the following formula (A1):

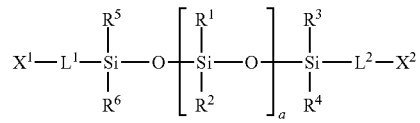

wherein $X^1$ and $X^2$ each independently represents a polymerizable functional group; $R^1$ to $R^6$ each independently represents a substituent selected from hydrogen, an alkyl group having 1 to 20 carbon atoms, a phenyl group and a fluoroalkyl group having 1 to 20 carbon atoms; $L^1$ and $L^2$ each independently represents a divalent group; and a represents the number of repetitions of siloxane units and represents an integer of 1 to 1,500.

10. The soft contact lens according to claim 9, wherein $X^1$ and $X^2$ in the formula (A1) are (meth)acryloyl groups.

11. The soft contact lens according to claim 1, wherein the component M is a polysiloxane compound represented by the following formula (ML1):

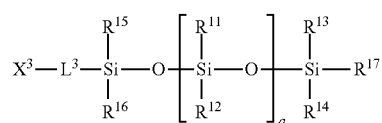

wherein $X^3$ represents a polymerizable functional group; $R^{11}$ to $R^{17}$ each independently represents a substituent selected from hydrogen, an alkyl group having 1 to 20 carbon atoms, a phenyl group and a fluoroalkyl group having 1 to 20 carbon atoms; $L^3$ represents a divalent group; and c represents an integer of 0 to 700.

12. The soft contact lens according to claim 1, wherein the substrate contains 5% by weight or more of silicon atoms, based on the amount of the substrate in a dry state (100% by mass).

13. The soft contact lens according to claim 1, wherein the copolymer further comprises a component B, which is a fluoroalkyl (meth)acrylate ester.

14. The soft contact lens according to claim 13, wherein the component B is 10 parts by mass to 500 parts by mass relative to 100 parts by mass of the component A, and
wherein the component M is 5 parts by mass to 200 parts by mass relative to 100 parts by mass of the component A.

15. The soft contact lens according to claim 1, wherein a surface of the substrate is modified by one of the following methods:
- (i) an LbL method (Layer by Layer method) in which two polymer materials having opposite charges are alternately coated layer by layer,
- (ii) a plasma processing method, or
- (iii) a γ-ray irradiation.

* * * * *